(12) United States Patent
Ozkaragoz et al.

(10) Patent No.: US 8,346,560 B2
(45) Date of Patent: Jan. 1, 2013

(54) DIALOG DESIGN APPARATUS AND METHOD

(75) Inventors: Inci Ozkaragoz, Torrance, CA (US);
Yan Wang, Torrance, CA (US);
Benjamin Ao, Torrance, CA (US)

(73) Assignee: Alpine Electronics, Inc, Tokyo (JP)

(*) Notice: Subject to any disclaimer, the term of this patent is extended or adjusted under 35 U.S.C. 154(b) by 904 days.

(21) Appl. No.: 12/434,394

(22) Filed: May 1, 2009

(65) Prior Publication Data

US 2010/0280819 A1 Nov. 4, 2010

(51) Int. Cl.
*G10L 21/00* (2006.01)
*G10L 21/06* (2006.01)
*G06F 3/00* (2006.01)
*G06F 3/048* (2006.01)

(52) U.S. Cl. ......... 704/270; 704/276; 715/727; 715/764
(58) Field of Classification Search .................. None
See application file for complete search history.

(56) References Cited

U.S. PATENT DOCUMENTS

| | | | | |
|---|---|---|---|---|
| 4,785,408 | A * | 11/1988 | Britton et al. | 704/270 |
| 5,860,059 | A * | 1/1999 | Aust et al. | 704/231 |
| 6,173,266 | B1 * | 1/2001 | Marx et al. | 704/270 |
| 6,314,402 | B1 | 11/2001 | Monaco et al. | |
| 6,321,198 | B1 * | 11/2001 | Hank et al. | 704/270 |
| 6,510,411 | B1 | 1/2003 | Norton et al. | |
| 7,143,042 | B1 | 11/2006 | Sinai et al. | |
| 7,712,031 | B2 * | 5/2010 | Law et al. | 715/728 |
| 2005/0043953 | A1 * | 2/2005 | Winterkamp et al. | 704/275 |
| 2005/0080628 | A1 * | 4/2005 | Kuperstein | 704/270.1 |
| 2006/0095268 | A1 * | 5/2006 | Yano et al. | 704/275 |
| 2007/0219803 | A1 * | 9/2007 | Chiu et al. | 704/270.1 |

FOREIGN PATENT DOCUMENTS

| | | |
|---|---|---|
| JP | 10154070 | 6/1998 |
| JP | 11110200 | 4/1999 |

* cited by examiner

*Primary Examiner* — Brian Albertalli
(74) *Attorney, Agent, or Firm* — Muramatsu & Associates

(57) ABSTRACT

A state oriented dialog design apparatus and method facilitates creation of natural language dialogs and provides data structures for voice user interfaces. The dialog design apparatus may include inputting means for receiving a user's prompt; response generating means for the user to generating at least one response; dialog structure generating means for structurally managing the user's input and response; and output means for outputting and displaying at least one dialog structure. A state used in the dialog design apparatus and method may include at least one system prompt and at least one response, and a linking unit may link a first state to a second state related to the first state, link the second state to a third state, and so on until certain system actions are achieved. A loop detecting unit in the dialog design apparatus and method detects and identifies loops in the dialog structure.

16 Claims, 12 Drawing Sheets

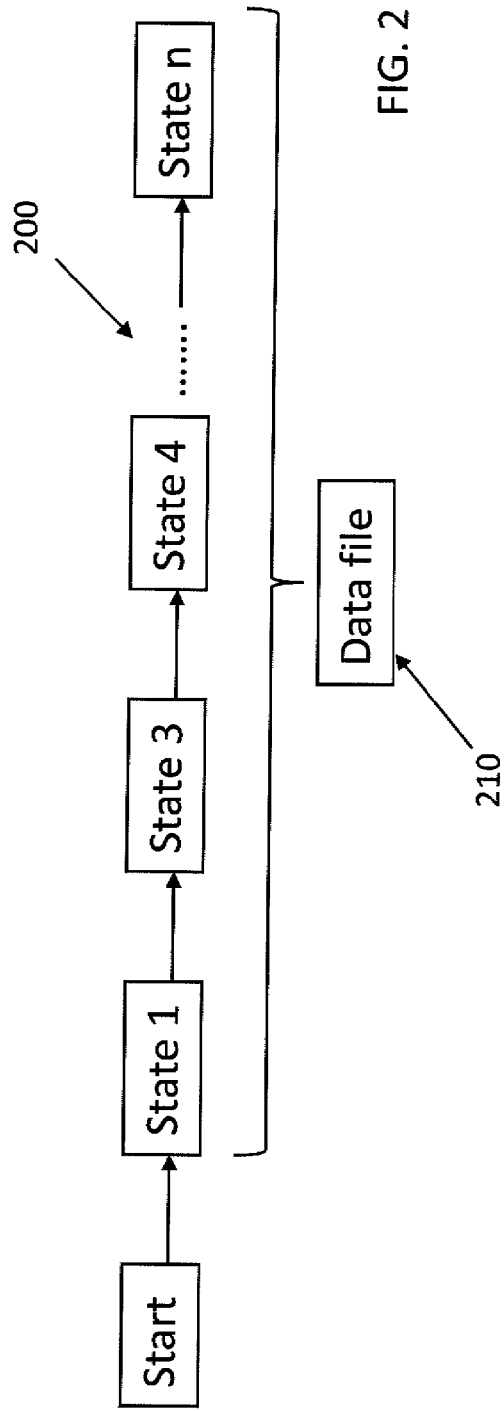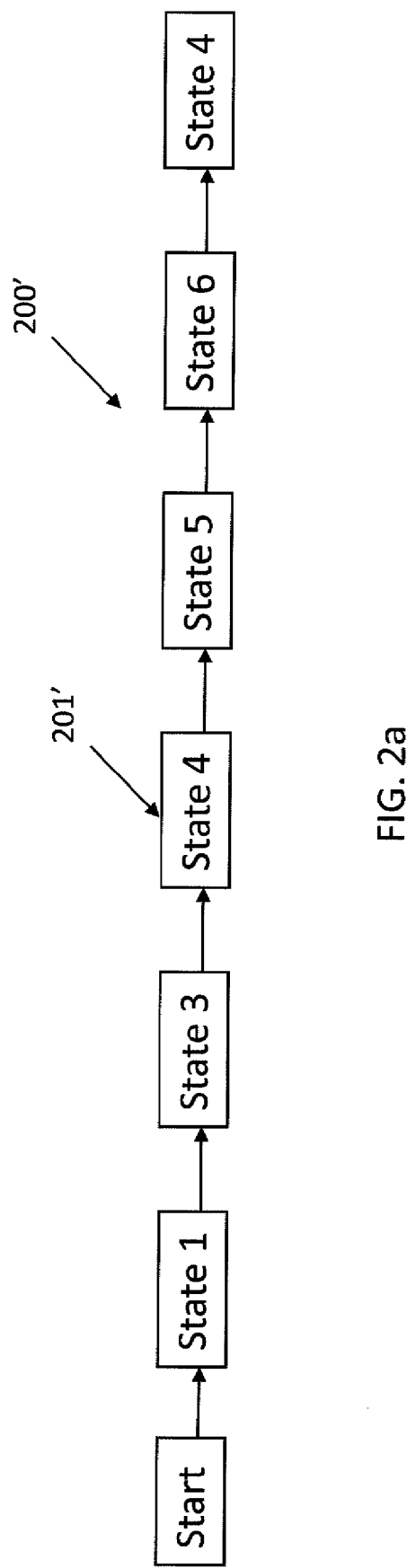

| Exchange Report | | |
|---|---|---|
| GetContext | | |
| System prompts | | |
| S: | What would you like to do? | Regular |
| S: | Would you like to navigate, play music, make a phone call... | Coach |
| Next Link | | |
| U: | What am I supposed to say? | |
| Link to State: | GetContext | |
| Next Link | | |
| U: | Play music | High CS |
| Link to State: | GetMusicInfo | |
| Next Link | | |
| U: | Play music | Mod CS |
| Link to State: | Verify | |
| Next Link | | |
| U: | Play music | Low CS |
| Link to State: | ErrorRepair1 | |

FIG. 3a

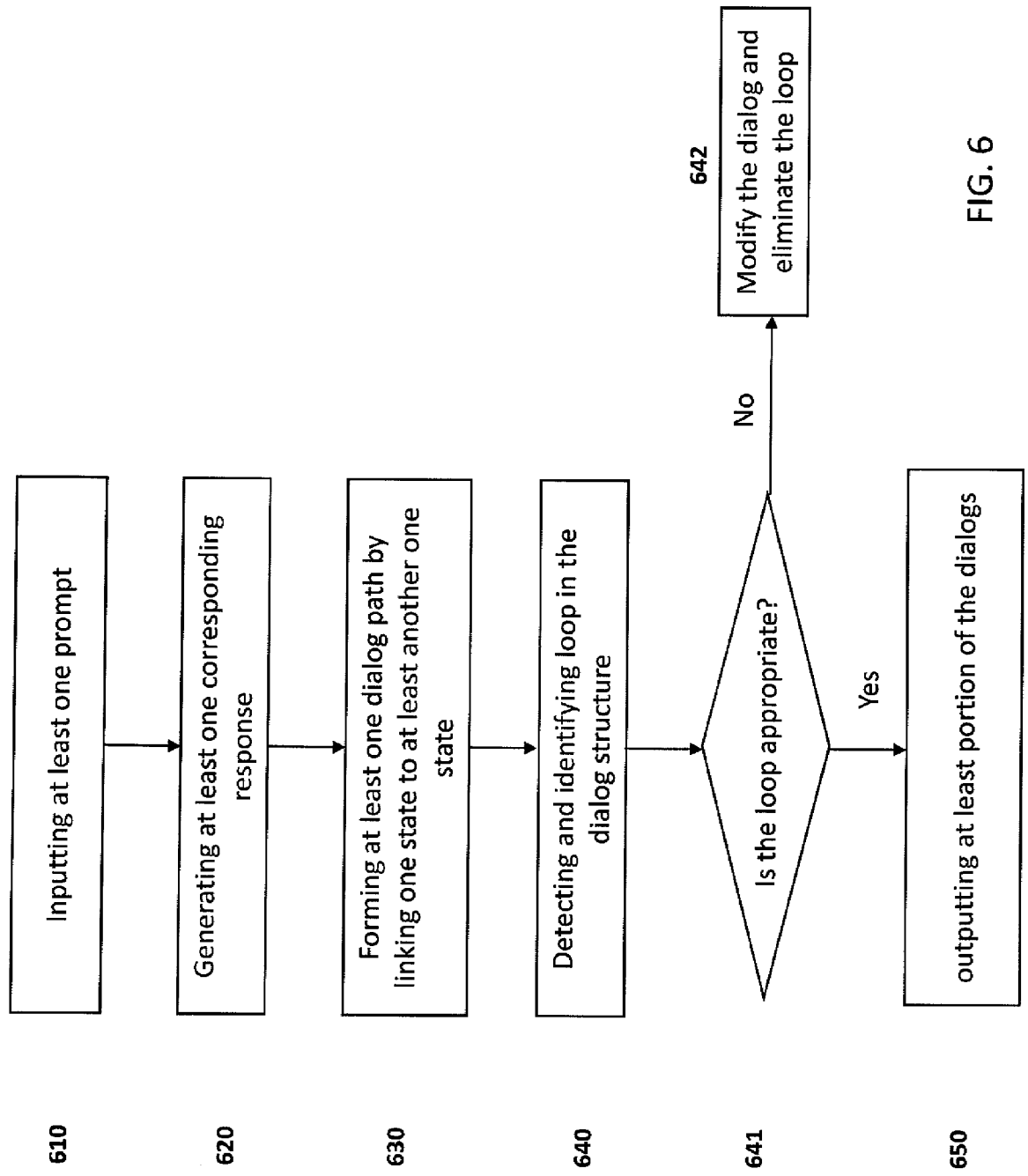

DIALOG DESIGN APPARATUS AND METHOD

FIELD OF THE INVENTION

This invention relates to a dialog design apparatus and method. More specifically, this invention relates to a state oriented dialog design apparatus and method to facilitate the creation of natural language dialogs and their data structures for voice user interfaces.

BACKGROUND OF THE INVENTION

With the remarkable advance in information technology, computers have become more and more important in our daily lives. Computer software or hardware engineers are no longer the only group of people interacting with computers. Consequently, non-technical users may still feel uncomfortable when interacting with computers because the "human-computer" interaction interface, such as the keyboard, and mouse, is unnatural and not user-friendly. Furthermore, in some user contexts such as driving a vehicle, such interfaces are not an option due to safety considerations.

To overcome this problem, voice user interface systems have been developed to provide a friendlier "human-computer" interface to allow users to communicate with computers with spoken dialog. Meanwhile, computers have been equipped with speech recognition and analyzing capability to convert the spoken dialog to computer understandable language, and dialog developers anticipate and design possible dialogs to facilitate natural language dialogs between computers and computer users.

Generally, a dialog developer needs to focus on scripting the language of the system prompts and user responses while maintaining the natural flow of the dialog. In most cases, the dialog developer may not have to develop the underlying code for the dialog at the same time, and it is almost impossible for a dialog developer to handle both tasks well because the skill set required for each task is substantially different. A tool and method which allows the developer to focus directly on the dialog flow development with an easy to use graphic interface is highly desirable.

During the process of dialog development, the data content and structure expands rapidly and can lead to a large number of possible dialog paths. If an error occurs in one of the dialog paths, it would be difficult and time-consuming for the dialog designer to locate the exact position of the error in order to correct it. Therefore, it would be helpful to the dialog designer if he or she could oversee the structure or network of the dialog paths in order to quickly identify the location of the error and correct the contents of the dialog more readily.

A "loop" is a common problem in dialog design, meaning that the dialog path does not proceed to a desirable ending, but keeps repeating or "looping back" to the same instance of dialog. For example, the loop problem may occur if one of the prompts in the dialog path is "where do you want to go?" and the dialog flow keeps going back to this prompt without reaching any meaningful ending of the dialog. However, the loop does not always indicate an error, for instance, if the user does not provide a clear and unambiguous response, the system may want to loop a verification prompt back for a clearer and more unambiguous response from the user. A dialog design tool which helps the dialog designer identify and detect loops in the dialog paths is also highly desirable.

Japanese patent publication (JP 10-154070) discloses a user interface design apparatus and method. More particularly, this invention discloses that a link is attached to each object to facilitate user interface simulation which is designed by the user. It states that the first link is designated through user operation to a second object which is correlated with the content of the first object, and a second link is generated to connect a third object which is associated with the content of the second object. However, this invention does not disclose how to locate a loop in the dialog path, nor provide the user an overview of the dialog path network and a quick way to retrieve the contents of the dialogs.

U.S. Pat. No. 5,577,165 to Takebayashi et al. discloses a speech dialog system capable of realizing natural and smooth dialog between the system and a human user, and easy maneuverability of the system. The dialog between the system and the user is managed by controlling transitions between user states during which the input speech is to be entered and system states during which the system response is to be outputted. However, Takebayashi does not disclose either how to visualize the network of the dialog paths, or how to detect and identify the loop in the dialog path.

U.S. Pat. No. 6,510,411 to Norton et al. discloses a task oriented dialog model and manager to simplify the process of developing call or dialog flows for use in a spoken dialog system. By using this dialog development tool, it is only necessary for the developer to input the application or task specific information into the development tool and leave management of the call flow and other generic tasks to the dialog manager as disclosed in this patent. However, like Takebayashi illustrated above, Norton also does not disclose or show how to visualize the network of the dialog paths, or how to detect a loop or loops in the dialog path in the dialog model. Furthermore, Norton discloses a task oriented dialog model instead of a state oriented model as in the present invention.

WO 02/37268 to Scholz et al. discloses a Dialog Flow Interpreter (DFI) for implementing low-level details of dialogs, as well as translator object classes for handling specific types of data (e.g., currency, dates, string, variables, etc.). More particularly, the DFI is able to drive the entire dialog of a speech application from start to finish automatically, thus eliminating the crucial and often complex task of dialog management. Even though Scholz discloses generating Data File 220, it does not disclose or teach anything related to how to manage the data file, such as how to visualize the network of the dialog paths, or how to detect a loop or loops in the dialog path, similar to the prior arts illustrated above.

Therefore, there remains a need for a new and improved dialog design apparatus and method which allows the user to design natural language dialogs and create easily extractable data structure for voice user interfaces.

SUMMARY OF THE INVENTION

It is an object of the present invention to provide a dialog design tool and method for a dialog designer to create system prompts and responses, while maintaining the natural flow of the dialog.

It is another object of the present invention to provide a dialog design tool and method for the dialog designer to navigate through all dialog paths and loops, if any.

It is another object of the present invention to provide a dialog design tool and method for the dialog designer to oversee the entire dialog structure of the dialog design and retrieve contents of dialogs therein.

It is still another object of the present invention to provide a dialog design tool and method for the dialog designer to easily extract the language data structure and test it with a speech synthesizer.

It is a further object of the present invention to provide a dialog design tool and method to easily translate the dialog into another language by directly translating the extractable language data into another language.

According to one aspect in the present invention, a system for developing state oriented dialogs comprises: prompt generating means for generating at least one system prompt; response generating means for the dialog designer to generate at least one response according to said system prompt; dialog path forming means for structurally linking one state to at least another one state which includes at least one system prompt and at least one corresponding response; and outputting means for outputting and displaying at least one dialog path and the contents therein.

The prompt generating means includes a message inputting unit adapted to receive and display the prompt designed by the dialog designer. In one embodiment, the inputting means may include a prompt indicator to indicate whether the message inputted by the dialog designer is a regular question, a hint or a coaching style question.

The response generating means includes a response generating unit to generate at least one response according to the prompt generated by the prompt generating means. The response generating means may further include a condition indicator to indicate the likelihood that the system correctly interpreted the language spoken by the user. A "confidence score" may be assigned in the condition indicator and provided to the response generating means to generate a reasonable response according to the correct meaning of the input. The dialog designer may have to take the confidence score into consideration while designing the dialogs. If the confident score is considered high, the dialog may proceed to a next state, however, if the confidence score is moderate or low, the dialog may not proceed, and may be linked to a verifying state to further verify the user's response, or to an error repair state where the user can repeat the response.

The dialog path forming means is adapted to link one state to at least another one state which includes at least one prompt and corresponding response. The dialog structure generated by the dialog path forming means can be extracted and tested in a dialog synthesizer. The dialog path forming means may include a loop detecting unit adapted to detect and identify the loop in the dialog path.

The output means may include an output unit to operatively couple with the dialog synthesizer which is used to extract and test the dialogs in at least a portion of the dialog paths. The output means may also include a display unit to display at least a portion of the dialogs in the dialog structure.

In another aspect, a method of developing a dialog comprises the steps of: inputting at least one prompt; generating at least one corresponding response; forming at least one dialog path by linking one state to at least another one state; detecting and identifying loop in the dialog path and outputting at least a portion of the dialogs in the dialog path. In one embodiment, the step of inputting at least one prompt comprises a step of indicating prompt type in the prompt indicator.

The step of generating at least one corresponding response may also include a step of determining the confidence score of the response. Likewise, if the confidence score is high, the dialog may proceed to a next state. On the other hand, if the confidence score is moderate or low, the dialog may not proceed, and may be linked to a verifying state to further verify the user's response, or to an error repair state where the user can repeat the response.

The step of forming at least one dialog path by linking one state to another state includes a step of utilizing a linking unit to link a first state to a second state related to the first state, link the second state to a third state (related to either the first or the second state, or both), and so on until certain system actions are achieved. The step of detecting and identifying loop in the dialog path includes a step of utilizing a loop detecting unit to detect and identify the loop in the dialog path to help the dialog designer fix inappropriate loops.

The step of outputting at least a portion of the dialog structure includes the step of extracting at least a portion of the dialogs in the dialog structure to the dialog synthesizer. In one embodiment, the step of outputting at least a portion of the dialog structure includes the step of displaying at least a portion of the dialog structure or the contents in the dialog structure on a display unit.

The present invention together with the above and other advantages may best be understood from the following detailed description of the embodiments of the invention illustrated in the drawings below.

BRIEF DESCRIPTION OF THE DRAWINGS

FIG. 2 illustrates a dialog path with at least one dialog path and a schematic view of a data file in the present invention.

FIG. 2a illustrates a dialog path including at least one loop therein.

FIG. 3a illustrates detail dialogs in the embodiment in FIG. 3.

FIG. 6 illustrates a method of developing dialogs in the present invention.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

The present invention relates to a dialog design apparatus/tool and method. More specifically, this invention relates to a dialog design apparatus and method to facilitate the writing of natural language dialog and create data structure for voice user interface. Furthermore, the present invention helps the user navigate through all dialog paths including loops, and oversee the entire data structure of the dialog design. Also, the user can easily extract the language data structure and test it with a speech synthesizer.

Figure 1:
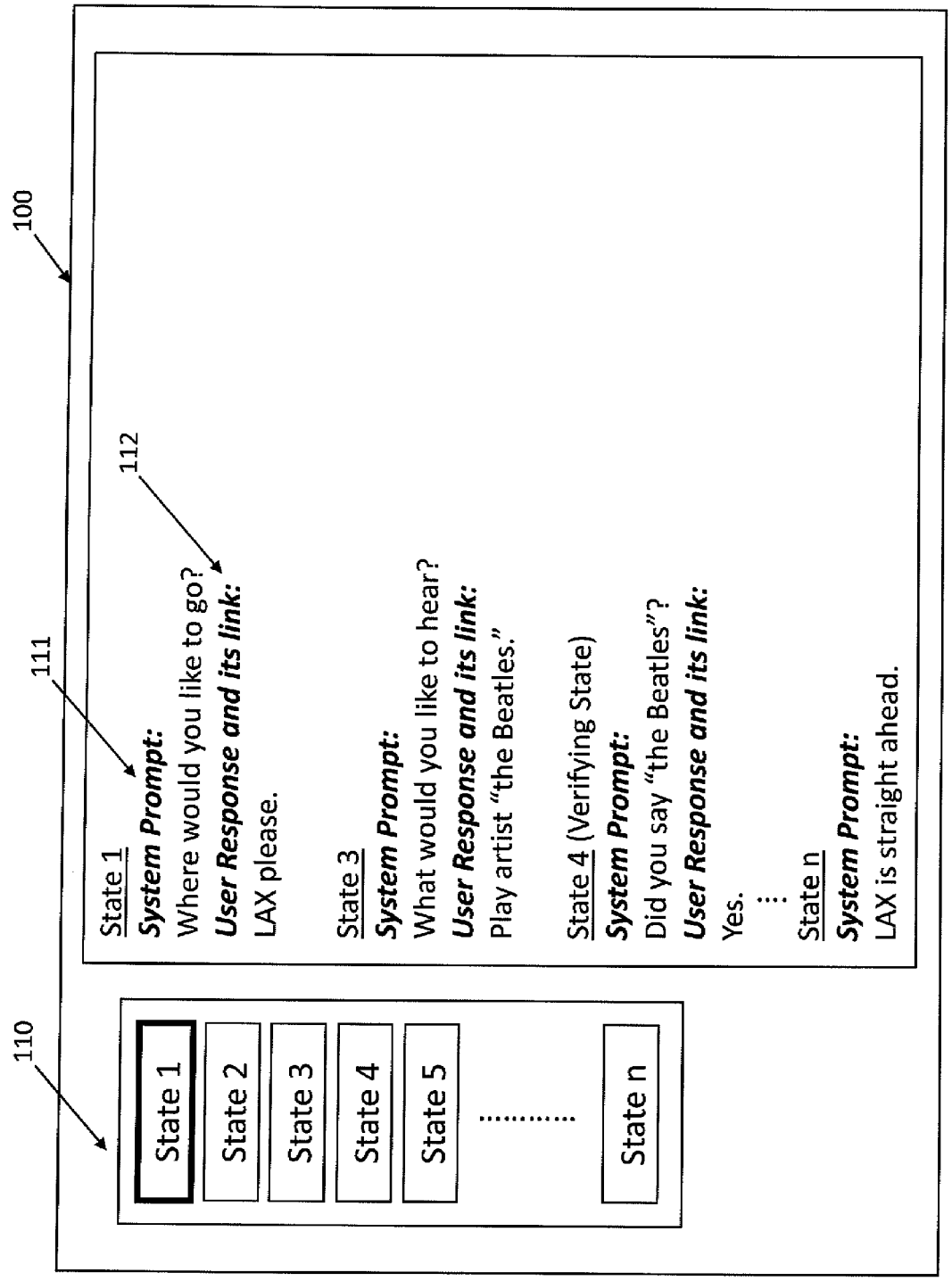
FIG. 1 illustrates a schematic view of a state oriented dialog design tool in the present invention.

Generally, a state oriented dialog tool is managed to collect three kinds of information to define a dialog. First, there is information about states. States have prompts, possible user responses, and possible system actions to the responses. Secondly, there is information about prompts for the states. Third, there is information about variables. Some system actions can be achieved by a single state, while certain system actions may be achieved by combining more than one state. Referring to FIG. 1, a state oriented dialog design tool 100 may include a state list 110 including at least one state used in designing the dialog, and each state may have at least one system prompt section 111 and at least one user response section 112. The system prompt section 111 is adapted to initiate conversation with the user, while the user response section 112 is designed by the dialog designer to anticipate the user's answer for possible system actions. In one embodiment, the user response section 112 may include more than one state based on the user's response, and each state is linked by a linking unit 113 (not shown).

As can be seen in FIG. 1, after the dialog design tool 100 receives the anticipated destination response from the user to the airport (LAX) in State 1, the linking unit 113 may link State 1 to one of the states associated with the enjoyment while driving, such as music playing in State 3. The linking unit 113 may further link State 3 to State 4 to verify the user's response in State 3, and link State 4 to at least one more state until the user reaches the destination, for example, in State n.

A dialog path 200 in FIG. 2 can be created according to the dialogs depicted in FIG. 1, wherein a system action, e.g. taking the user to the airport, is achieved by combining more than one state. In one embodiment, the combination of the associated states is considered a "data file" 210 which can be partially or entirely extracted and tested with a speech synthesizer. In another embodiment, the data file can facilitate translation from one language to another language.

As illustrated above, a "loop" is a common problem in dialog design, meaning that the dialog path does not proceed to the desirable end results, but keeps "looping" back to one or more previous states. For example, in a dialog path 200' in FIG. 2a, the dialog keeps looping back to "State 4" 201' in the dialog flow. This may happen when the "State 4" 201' is a verifying state which is generally used to verify the user's response before proceeding to the next state. On the other hand, the loop may occur when the dialog designer makes some mistakes when designing the dialogs.

Figure 3:
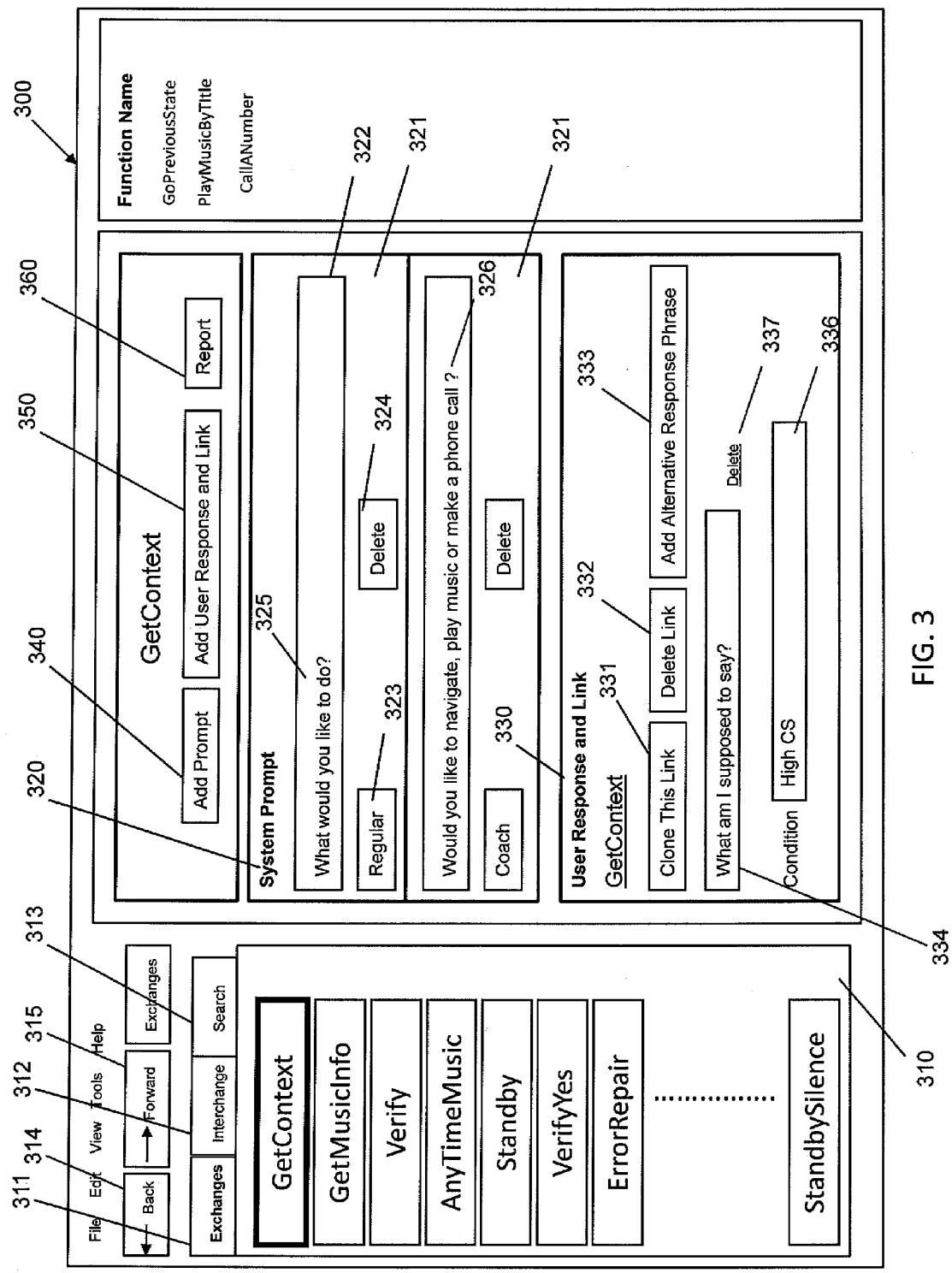
FIG. 3 illustrates one embodiment of the state oriented dialog design tool in the present invention.

Referring to FIG. 3, a dialog design system 300 in the present invention may include a state list 310, a system prompt section 320, and a user response and link section 330.

The system 300 further includes a prompt adding button 340, a response and link adding button 350, and a report button 360. The state list 310 may include at least one state used in the dialog. In one embodiment, the dialog may include more than one state connecting with each other to achieve certain system actions.

The system prompt section 320 may include at least one prompt unit 321 including a message inputting space 322, a prompt indicator 323 and a delete button 324. The message input space 322 allows the designer to input system prompt which may include more than one message as shown in FIG. 3. The prompt indicator 323 is used to indicate whether the message inputted by the designer is a regular question, a hint or a coaching style question. For example, a message such as 325 "What would you like to do?" is considered a regular question while a message such as 326 "Would you like to navigate, play music, make a phone call or control the climate in your car?" is considered a coaching style question. In addition, the delete button 324 is used to delete the system prompt message while the prompt adding button 340 is adapted to create the prompt unit 321 in the system prompt section 320.

The user response and link section 330 includes at least one state where the dialog designer can create anticipated responses as to the questions in the system prompt 320. Each state may include a link cloning button 331, a link delete button 332, an alternative response adding button 333 and a response inputting space 334. The user response and link section 330 may further include a linking unit 335 (not shown) to link a first state to a second state related to the first state, link the second state to a third state (related to the first or the second state, or both), and so on until certain system actions are achieved. The link cloning button 331 is used to duplicate one specific state (with identical response and condition) and attach the state to the end of the response and link section 330, while the link delete button 332 deletes one specific state in the response section 330.

The response inputting space 334 allows the dialog designer to input anticipated answers corresponding to the questions in the system prompt. The response can be deleted by clicking a response delete button 337. The response and link section 330 may further include a condition indicator 336 to indicate the likelihood that the system correctly interpreted the language spoken by the user. As illustrated above, a "confidence score" (CS) may be used in the condition indicator 336. If the confidence score is high (High CS), namely the user's response is likely to be correctly interpreted by the dialog design system 300, the linking unit 335 will link the current state to the next state based upon the response. On the other hand, if the confidence score is moderate (Mod CS) or low (Low CS), the linking unit 335 may link the current state to a verifying state or an error repairing state to have the user input the response again until the confidence score becomes high.

The response and link adding button 350 adds a blank state attaching at the end of the user response and link section 330 for the designer to input more responses. Moreover, the report button 360 enables the designer to overview the entire dialog in each state. As illustrated in FIG. 3a, once the designer clicks on the report button 360, the dialogs in detail are shown according to the state "GetContext" illustrated in FIG. 3, for the designer to fix the dialogs if necessary. This feature may be particularly helpful when the dialogs are complicated.

Figure 3B:
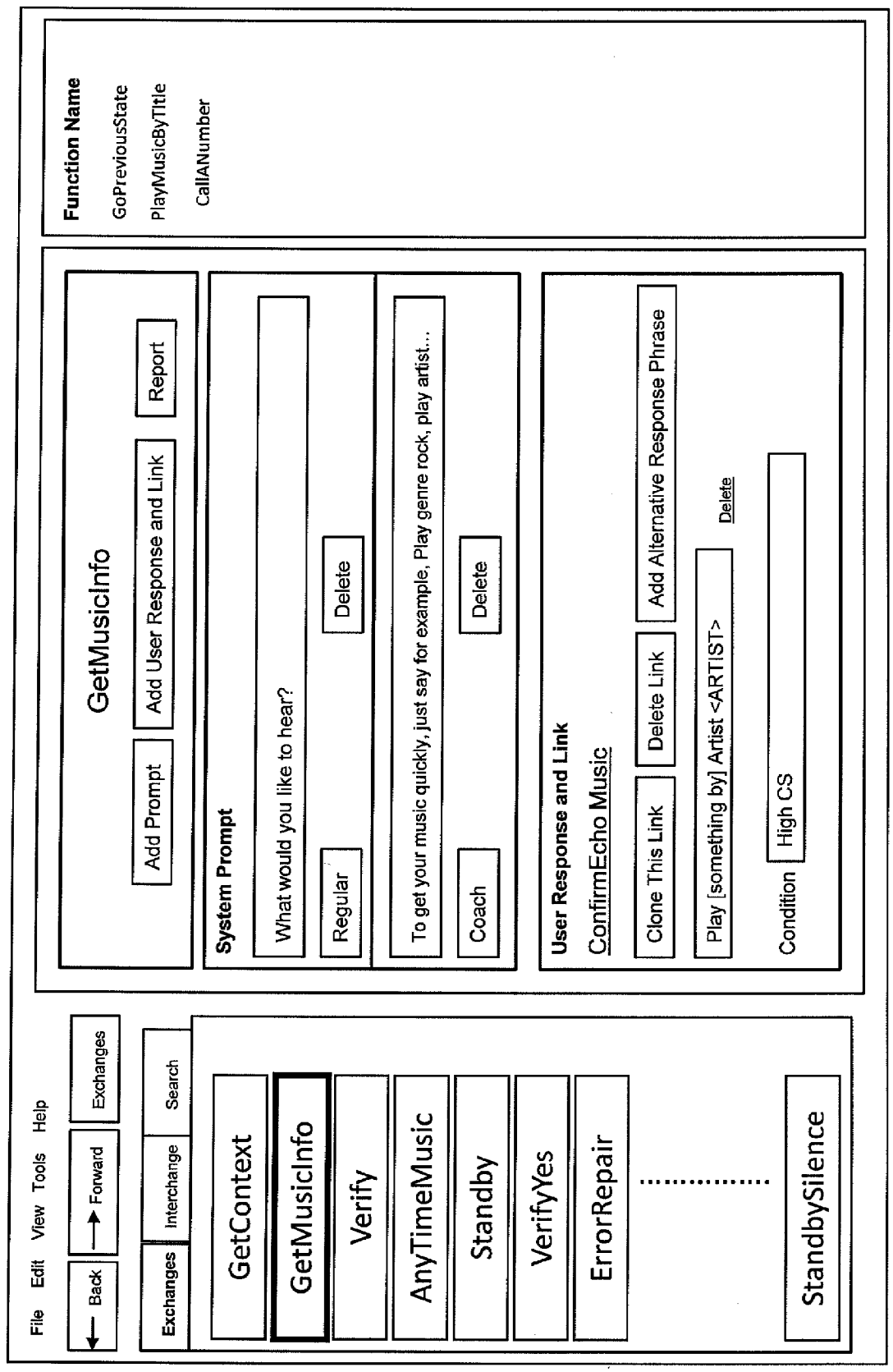
FIG. 3b illustrates a different state in the dialog design tool in the present invention.
Figure 3C:
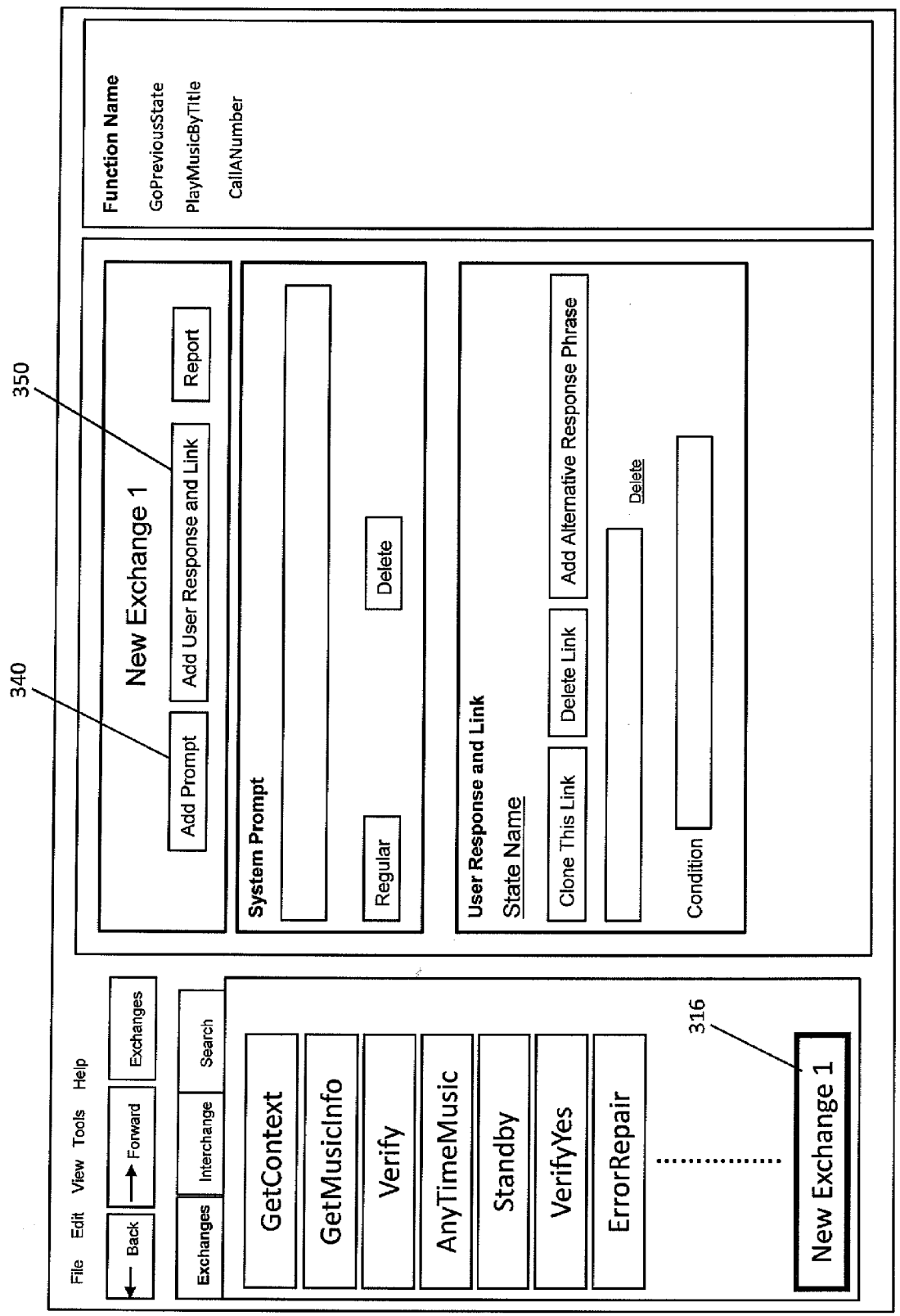
FIG. 3c illustrates adding a new state in the dialog design tool.

Still referring to FIG. 3, the dialog design system 300 may include a plurality of status tabs which are located above the state list 310. The status tabs include exchange 311, interchange 312 and search 313. In the exchange status 311, when the designer selects different states in the state list 310, the entire dialogs in each state are displayed. For example, FIG. 3 illustrates the entire dialogs for the state "GetContext," while FIG. 3b shows the entire dialogs for the state "GetMusicinfo." In addition to looking into the dialogs in each state, the designer can also create a new state 316 in the state list 310 wherein the designer can input system prompts and anticipated user responses by starting from the prompt adding button 340 and the response and link adding button 350, as shown in FIG. 3c. The designer can also rename the new state 316 if necessary.

Figure 4:
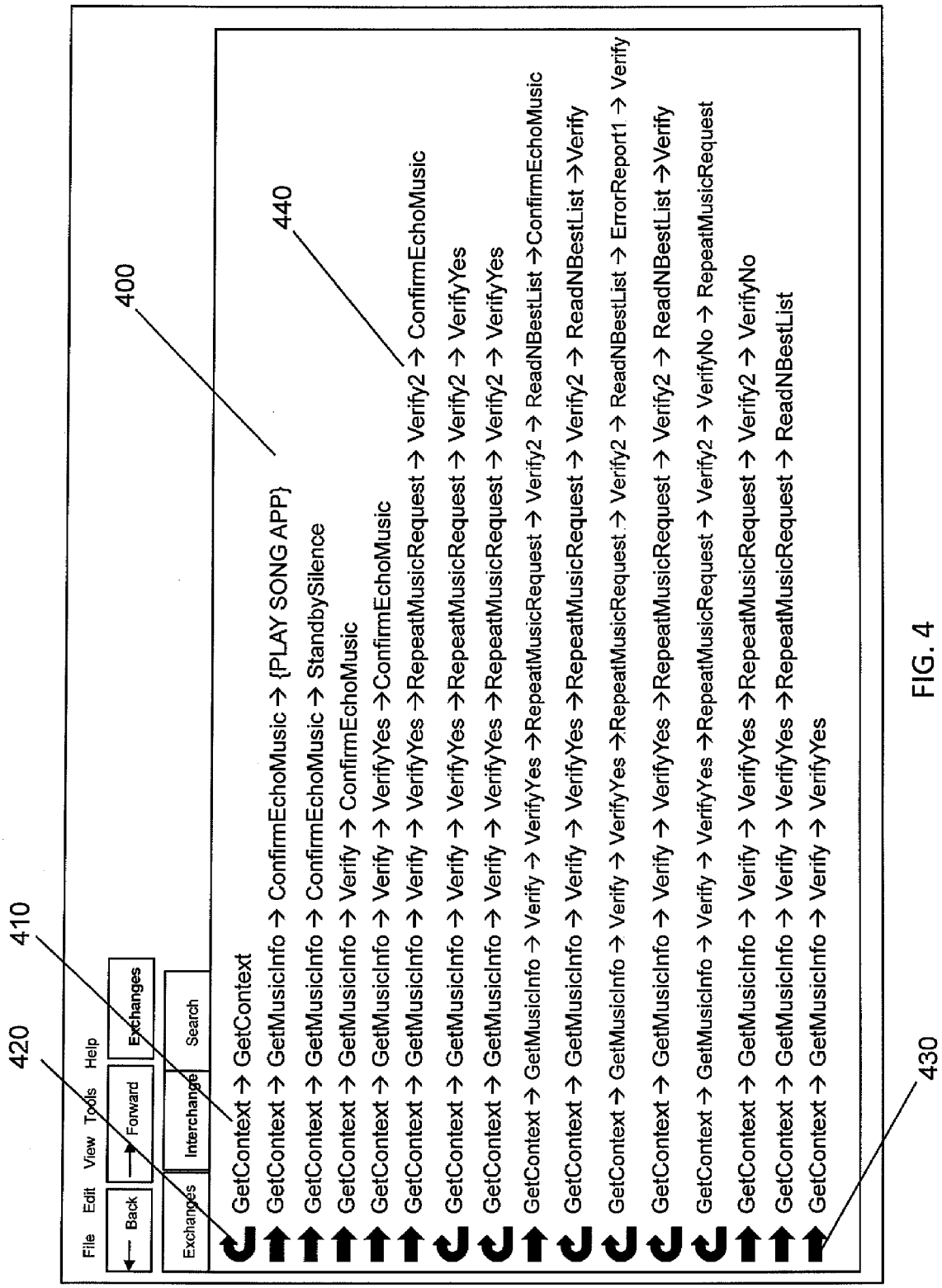
FIG. 4 illustrates a dialog structure including more than one dialog path, starting from one specific state.
Figure 4A:
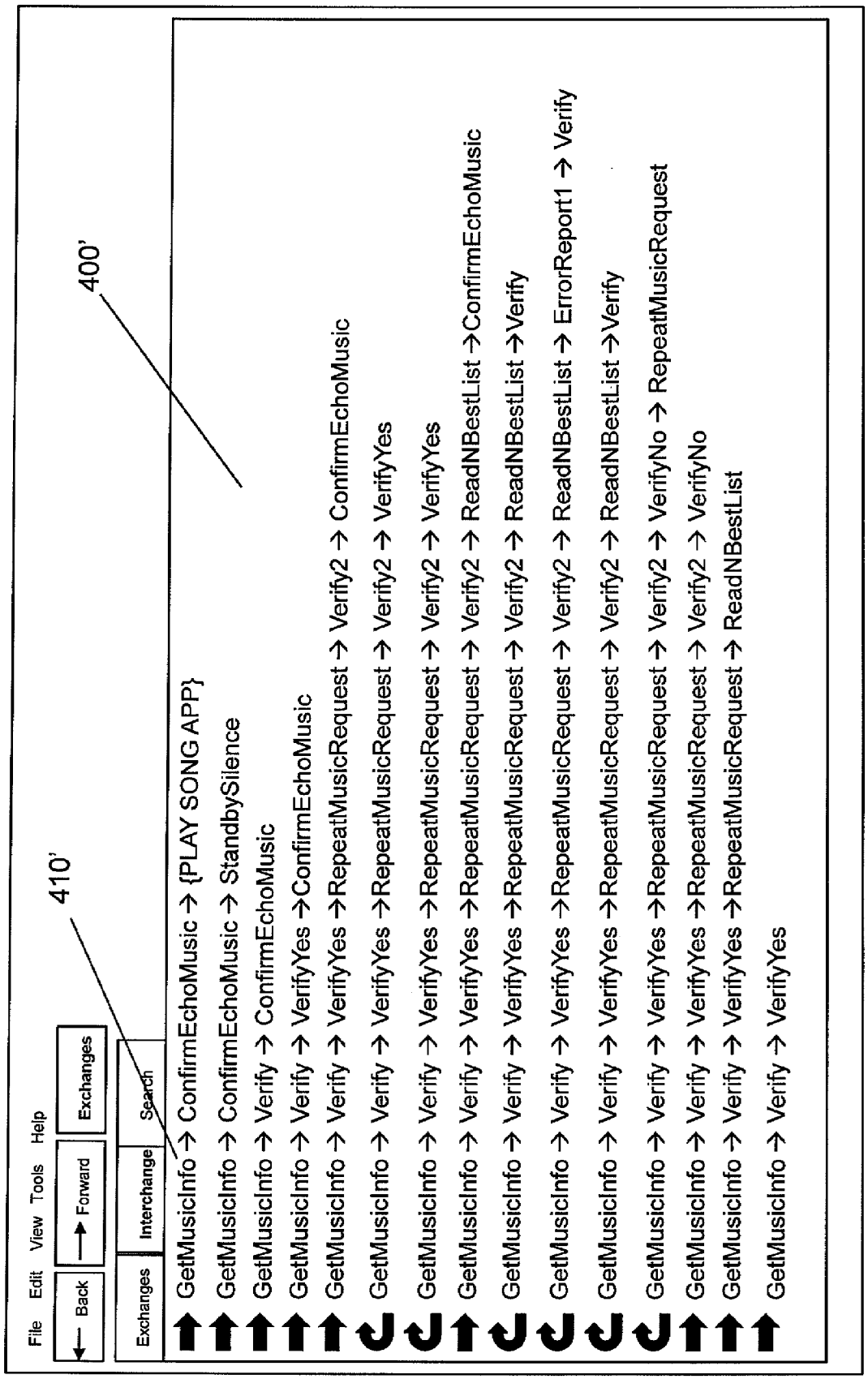
FIG. 4a illustrates another dialog structure including more than one dialog path, starting from another state.

The interchange tab 312 provides a structural overview of the dialogs in each state any time during the process of the dialog design. The designer may have to specify a starting state before receiving such overview information. As depicted in FIG. 4, for instance, the structural overview 400 starts from the state 410 "GetContext," while the structural overview 400' starts from the state 410' "GetMusicInfo" in FIG. 4a. In one aspect, the structural overview 400 (or 400') is simply a combination of a plurality of the dialog path 200 generated by the dialog path forming means. In addition, at least a portion of the dialog structure in the structural overview 400 can be considered a "data file" which can be extracted and tested with a speech synthesizer.

As discussed above, sometimes the loop occurs to verify the user's response, but sometimes the loop occurs due to the user or designer's mistake. Furthermore, if the dialog path is complicated, it is difficult for the dialog designer to discover the loop. The dialog system 300 in the present invention further includes a loop detecting unit 370 (not shown) to detect and identify loop(s) in dialog paths to help the dialog designer fix inappropriate loops. Referring to FIG. 4, if the loop detecting unit 370 indicates that the dialog path has a loop, a loop indicator 420 is placed in front of the dialog path. On the other hand, if the dialog ends properly without loop, an arrow sign 430 is placed in front of the dialog path.

Figure 4C:
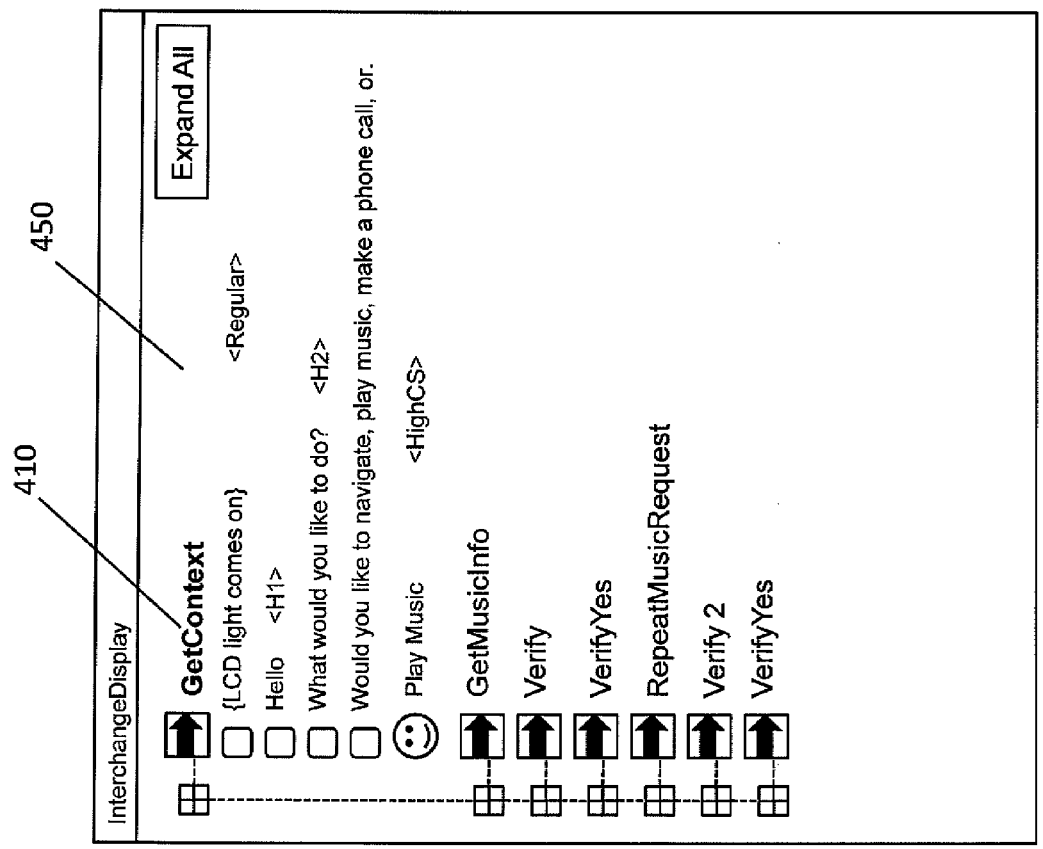
FIG. 4c illustrates one embodiment to show detail dialogs in one specific state in the dialog path in FIG. 4b.
Figure 4B:
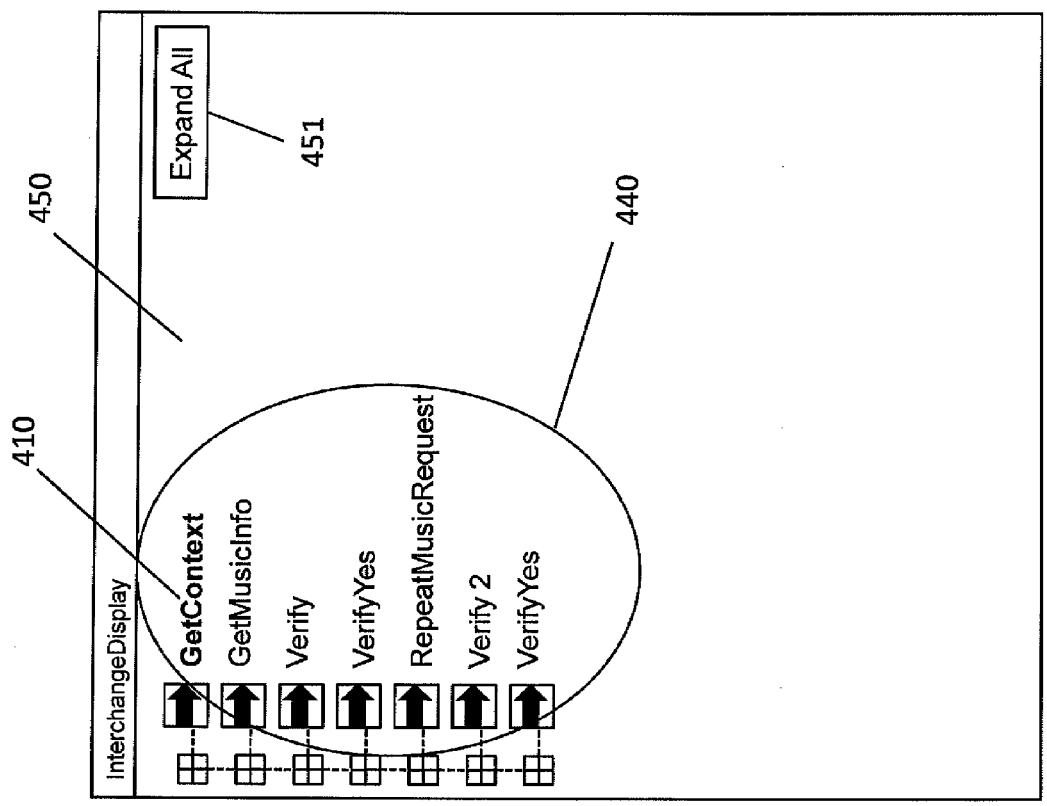
FIG. 4b illustrates a dialog path including more than one state.
Figure 4D:
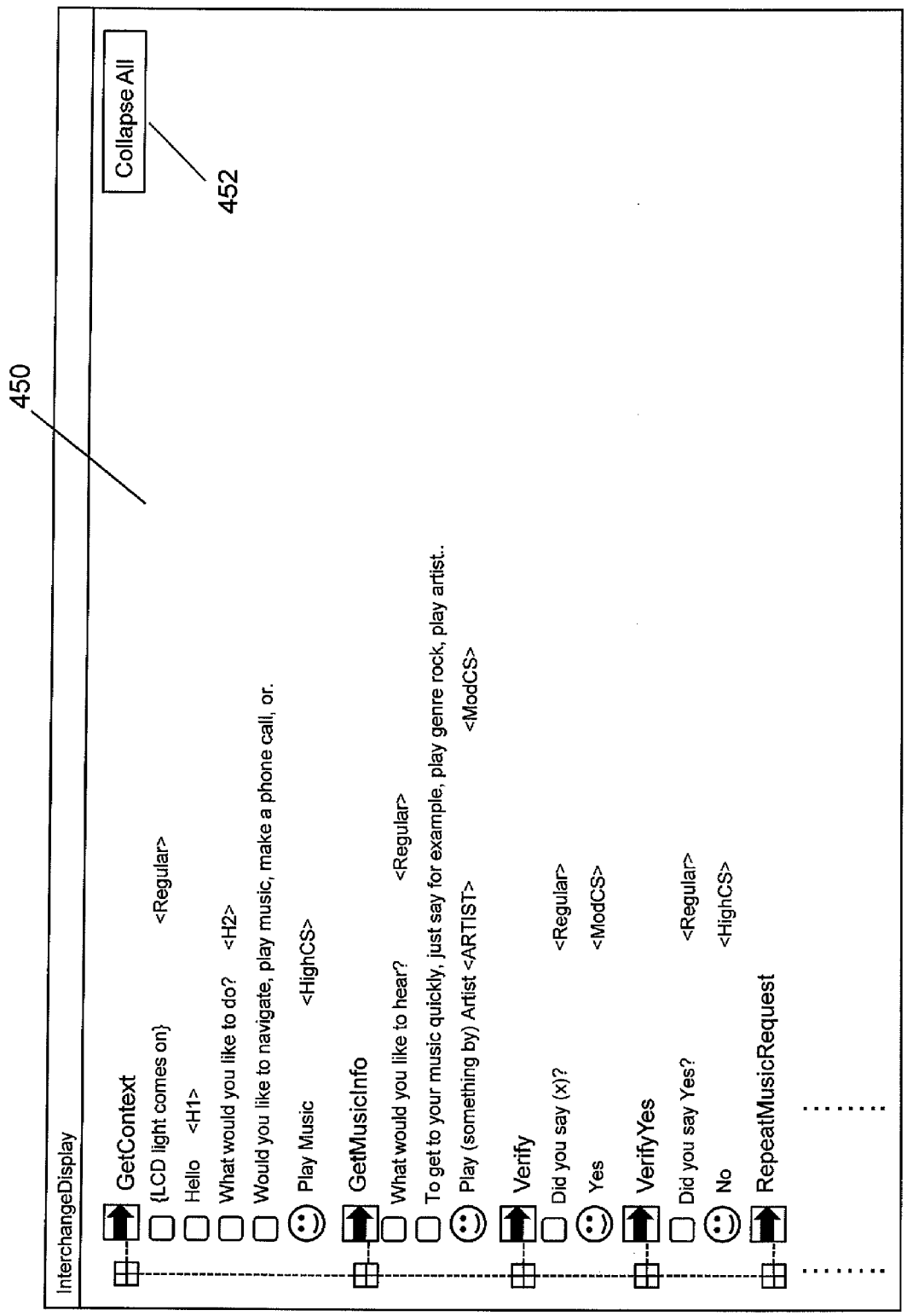
FIG. 4d illustrates another embodiment to show detail dialogs in every state in the dialog path in FIG. 4b.

In addition to providing structural overview of the entire dialog and detecting loops in the dialog path, the present invention allows the dialog designer to look into each dialog path to retrieve the contents therein. As shown in FIGS. 4 and 4b, when the designer double clicks a dialog path 440, a state display window 450 is shown in which each state in the dialog path 440 is listed. The designer can further double click on any of the listed states to retrieve detail dialogs therein. For instance, if the designer double clicks on the state 410 "GetContext," the entire dialog is displayed as illustrated in FIG. 4c. The state display window 450 includes an "Expand All" button 451 adapted to display detail dialogs in each state simultaneously. Once the designer double clicks on the "Expand All" button 451, detail dialogs of each state are displayed as FIG. 4d. The state display window 450 also includes a "Collapse All" button 452 in FIG. 4d to collapse all detail dialogs to each state and restore the state display window 450 to the status in FIG. 4b.

Figure 5:
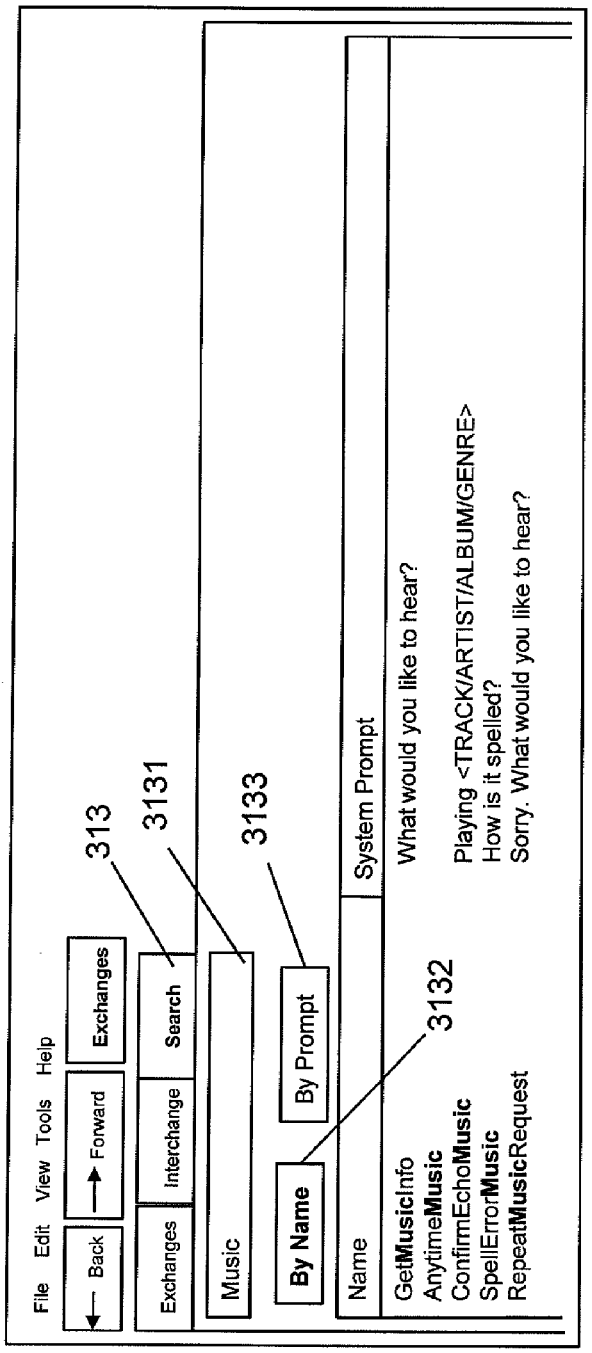
FIGS. 5 and 5a illustrate a search function (either by state name or by prompt) in the present invention.
Figure 5A:
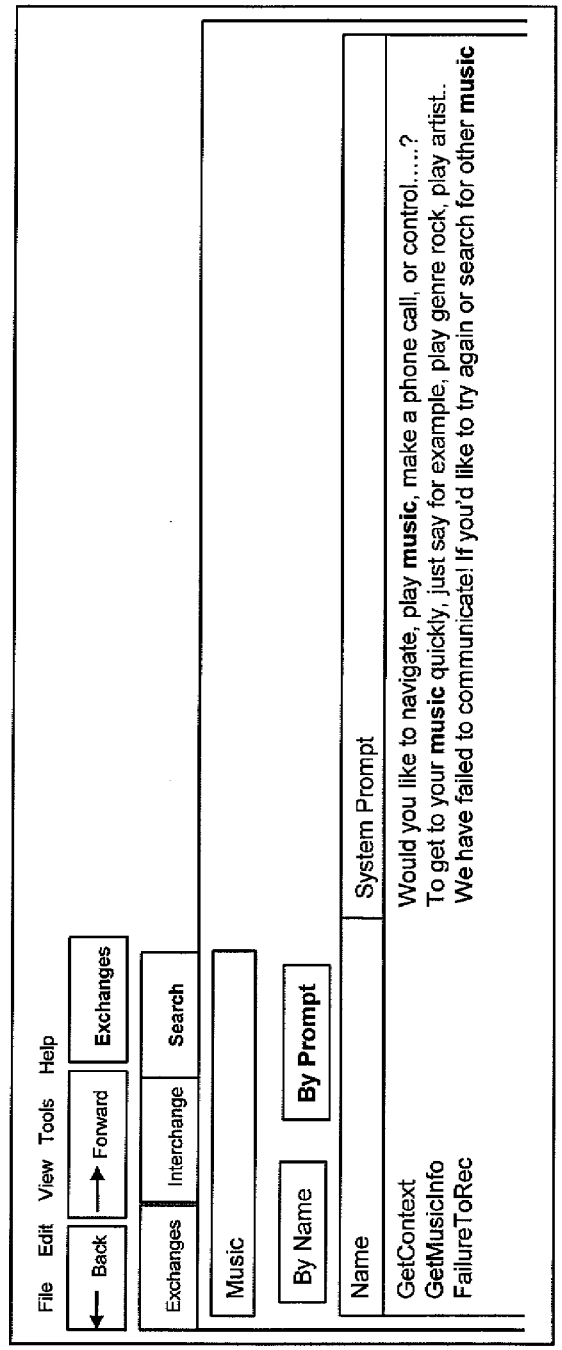

The search tab 313 in the present invention shown in FIG. 3 provides a key word search function to the dialog designer. More specifically, the designer can perform a key word search either "By name" (of the state) 3132 or "By prompt" 3133. For example, when the designer inputs the key word "music" in a searching space 3131, the system 300 starts searching for the key word "music" either appearing in the state name or in the system prompt, and the results are displayed in a manner shown in FIGS. 5 and 5a, respectively.

In another aspect according to FIG. 6, a method of developing dialogs comprises: inputting at least one prompt 610; generating at least one corresponding response 620; forming at least one dialog path by linking one state to at least another one state 630; detecting and identifying the loop in the dialog structure 640; and outputting at least a portion of the dialogs 650. The step of inputting at least one prompt 610 includes a step of indicating prompt type in the prompt indicator 323. The step of inputting at least one prompt 610 may further include a step of adding the prompt unit 321 in the system prompt section 320 for the designer to enter new prompt.

The step of generating at least one corresponding response 620 includes a step of including at least one state where the dialog designer can create anticipated responses as to the questions in the system prompt 320. The step 620 may further include a step of determining the confidence score in the condition indicator 336.

The step of forming at least one dialog path by linking one state to another state 630 includes a step of utilizing a linking unit 335 (not shown) to link a first state to a second state related to the first state, link the second state to a third state (related to either the first or the second state, or both), and so on until certain system actions are achieved.

Still referring to FIG. 6, the step of detecting and identifying loop in the dialog structure 640 includes a step of utilizing a loop detecting unit 370 (not shown) to detect and identify the loop in the dialog paths to help the dialog designer fix inappropriate loops. As discussed above, the dialog path may need some loops to confirm the speaker's response. If the loop is considered appropriate, the dialog structure can be outputted at least in some portions according to the need of the designer as illustrated in steps 641 and 650. On the other hand, the designer may have to modify the dialog (642) if the loop is considered inappropriate in step 641.

In one embodiment of step 650, the step of outputting at least a portion of the dialogs may include a step of providing the structural overview of the entire dialog to the designer. Furthermore, as illustrated in FIGS. 4 and 4b-4d, the structural overview may include at least one dialog path and the designer can look into each dialog path to retrieve the contents therein.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A dialog design tool comprising:
an information receiving unit adapted to receive the information inputted by a dialog designer;
a dialog path forming unit adapted to process the information in the information receiving unit; and
an outputting and displaying unit;
wherein the dialog path forming unit generates a dialog structure which includes at least one dialog path;
wherein the outputting and displaying unit is configured to graphically display the dialog structure;
wherein the dialog path forming unit comprises a linking unit adapted to link one state to a next related state to form at least one dialog path;
wherein the dialog path forming unit further comprises a loop detecting unit which is configured to detect and identify a loop in each dialog path, and the dialog designer is allowed to edit the loop-containing dialog; and
wherein the outputting and displaying unit is further configured to display a loop indicator in front of the dialog if the loop detecting unit detects that the dialog path has a loop.

2. The dialog design tool of claim 1, wherein the information receiving unit comprises at least one state which includes at least one system prompt section and at least one user response section where the dialog designer creates anticipated responses to the corresponding system prompt.

3. The dialog design tool of claim 1, wherein the loop indicator is a graphic icon.

4. The dialog design tool of claim 3, wherein the dialog designer is allowed to overview the dialog path starting from different states and allowed to edit the dialog in each state.

5. The dialog design tool of claim 3 further comprises a searching unit which allows the dialog designer to search a key word in the state or in the system prompt.

6. A method of developing state oriented dialogs comprising the steps of:
   inputting at least one prompt;
   generating at least one corresponding response according to the prompt;
   forming at least one dialog path by linking one state to at least another one state by a linking unit;
   detecting and identifying leap a in the dialog path by a loop detecting unit; and
   outputting at least one dialog path which can be expanded partially or entirely to graphically display dialogs therein;
   wherein the step of forming at least one dialog path includes a step of linking a first state to a next related state based on a response in the first state;
   wherein the step of detecting and identifying a loop in the dialog path includes a step of allowing the dialog designer to edit the dialog in the dialog path containing the loop; and
   wherein the step of outputting at least one dialog path is includes a step of displaying a loop indicator in front of the dialog if the loop detecting unit detects that the dialog path has a loop.

7. The method of developing state oriented dialogs of claim 6, wherein the step of inputting at least one prompt includes a step of indicating prompt type in the prompt indicator.

8. The method of developing state oriented dialogs of claim 6, wherein the step of generating at least one corresponding response includes a step of determining a confidence score of the response.

9. The method of developing state oriented dialogs of claim 6, wherein the loop indicator is a graphic icon.

10. The method of developing state oriented dialogs of claim 6, wherein the step of forming at least one dialog path by linking one state to at least another one state comprises a step of forming a dialog structure including at least one dialog path.

11. The method of developing state oriented dialogs of claim 6, wherein the step of detecting and identifying loop in the dialog path includes a step of utilizing a loop detecting unit to detect and identify the loop or loops in the dialog structure.

12. A state oriented dialog design system comprising:
   dialog managing means for managing messages inputted by a dialog designer;
   dialog synthesizing means for structurally linking one state to at least another one state to form a dialog path, path; and
   outputting means for outputting and displaying at least one dialog path which can be expanded partially or entirely to display dialogs therein;
   wherein the dialog synthesizing means comprises a loop detecting unit to detect and identify a loop in the dialog path;
   wherein the dialog synthesizing means allows the dialog designer to edit the dialog in the dialog path containing the loop; and
   wherein outputting means for outputting and displaying at least one dialog path is further configured to display a loop indicator in front of the dialog if the loop detecting unit detects that the dialog path has a loop.

13. The state oriented dialog design system of claim 12, wherein the dialog managing means comprises at least one system prompt section and at least one user response section where the dialog designer creates anticipated responses to the corresponding system prompt.

14. The state oriented dialog system of claim 12, wherein the dialog synthesizing means provides a dialog structure comprising at least one dialog path.

15. The state oriented dialog system of claim 12, wherein the loop indicator is a graphic icon.

16. The state oriented dialog system of claim 12 further comprises a searching means for searching a key word in the state or in the system prompt.

* * * * *